United States Patent [19]

Matsuura et al.

[11] Patent Number: 5,180,957
[45] Date of Patent: Jan. 19, 1993

[54] TRACING CONTROL SYSTEM

[75] Inventors: Hitoshi Matsuura, Hachioji; Hitoshi Aramaki, Hino, both of Japan

[73] Assignee: Fanuc Ltd., Minamitsuru, Japan

[21] Appl. No.: 668,516

[22] PCT Filed: Jul. 20, 1990

[86] PCT No.: PCT/JP90/00938

§ 371 Date: Mar. 25, 1991

§ 102(e) Date: Mar. 25, 1991

[87] PCT Pub. No.: WO91/02624

PCT Pub. Date: Mar. 7, 1991

[30] Foreign Application Priority Data

Aug. 25, 1989 [JP] Japan .................. 1-219832

[51] Int. Cl.$^5$ .................. B23Q 35/12; G05B 19/24
[52] U.S. Cl. .................. 318/578; 318/570; 318/571; 364/474.03; 364/474.02
[58] Field of Search .............. 318/560–630; 364/474.01–474.32; 409/80, 99, 98, 127

[56] References Cited

U.S. PATENT DOCUMENTS

| | | | |
|---|---|---|---|
| 3,688,642 | 9/1972 | Negoro | 318/578 X |
| 3,842,330 | 10/1974 | Kolell | 318/567 |
| 4,424,570 | 1/1984 | Imazeki et al. | 318/578 X |
| 4,605,886 | 8/1986 | Inoue | 318/565 |
| 4,617,761 | 10/1986 | Miyatake et al. | 318/685 X |
| 4,631,869 | 12/1986 | Miyatake et al. | 318/685 X |
| 4,639,172 | 1/1987 | Kishi et al. | 318/570 X |
| 4,646,225 | 2/1987 | Matsuura | 318/578 X |
| 4,703,239 | 10/1987 | Yamazaki et al. | 318/578 |
| 4,746,251 | 5/1988 | Yoshikawa et al. | 318/578 X |
| 4,967,364 | 10/1990 | Yamazaki et al. | 318/578 X |
| 4,999,555 | 3/1991 | Yamazaki et al. | 318/578 |
| 5,015,130 | 5/1991 | Matsuura et al. | 318/578 X |

FOREIGN PATENT DOCUMENTS 0074462 3/1983 European Pat. Off. .

Primary Examiner—Paul Ip
Attorney, Agent, or Firm—Staas & Halsey

[57] ABSTRACT

A tracing control system for machining a workpiece through tracing by calculating speed command values of respective axes, using change amounts detected by a tracer head, and moving a cutter relative to the workpiece through control of the speed of the respective axes in accordance with the speed command values. The system is provided with calculating means for calculating predetermined values in proportion to amounts of change in the speed command values of the respective axes, and a U-axis motor and a W-axis motor for moving only a model in parallel with the above respective axes by amounts corresponding to the respective predetermined values. A sub-table, on which only the model is placed is provided on a main table of a tracing machine tool, is moved in the same direction as the direction of movement of the main table, by an amount proportional to the amounts of change in the speed command values, for example, the amounts of delay in the reactions of the servo systems. Thus, the tracer head always precedes the cutter. When the tracer head comes to a corner and the axis speed is reduced, the sub-table is returned by the amount corresponding to the reduction in the axis speed. This return amount corresponds to the amount of over-run of the tracer head in the axial direction. Because the amount of movement of the cutter is reduced by the over-run amount, overshot machining is prevented.

3 Claims, 4 Drawing Sheets

TRACING CONTROL SYSTEM

DESCRIPTION

Background of the Invention

The present invention relates to a tracing control system, and more particularly, to a tracing control system by which overshot machining at corners and the like of a workpiece is prevented.

A tracing control system uses a tracer head to detect amounts of displacement of respective axes applied to a stylus, and speed command values of the respective axes are calculated in a tracing calculating circuit by using these amounts of displacement. A cutter is moved relative to a workpiece by drive motors of the respective axes, in accordance with these speed command values, and at the same time, the tracer head is moved along the surface of a model at the same speed. This motion is repeated, and accordingly, the workpiece is machined to the same shape as the model.

Tracing control systems of this kind, however, have a problem in that regions of the model at which the shape is abruptly changed cannot be precisely traced. Namely, when the stylus comes to corners and the like of the model, an over-run of the tracer head occurs due to a delay in the reaction of the servo systems, and as a result, the overshot machining into the workpiece by the same amount of over-run, and thus the machining precision at corners is lost.

Summary of the Invention

The present invention has been created in view of the aforesaid drawbacks, and an object thereof is to provide a tracing control system by which overshot machining at corners, etc., of a workpiece is prevented, and thus the tracing control system has a high precision.

To achieve the above object, in accordance with the present invention there is provided a tracing control system for machining a workpiece through tracing by calculating speed command values of respective axes, using change amounts detected by a tracer head, by moving a cutter relative to the workpiece through a control of the speed of the respective axes in accordance with the speed command values and by moving the above tracer head along the surface of the model, comprising calculating means for calculating predetermined values in proportion to the amounts of change in the above speed command values of the respective axes, and a movement control means for moving only the model in parallel with the above respective axes by amounts corresponding to the above respective predetermined values.

A sub-table on which only the model is placed is provided on a main table of a tracing machine tool. This sub-table is moved in the same direction as the direction of movement of the main table, by an amount proportional to the amount of change in the speed command value, for example, the amount of delay in the reaction of a servo system. As a result, the tracer head always precedes the cutter, and when the tracer head comes to a corner and the axis speed is reduced, the sub-table is returned by the amount corresponding to the reduction in the axis speed. This return amount corresponds to the amount of over-run of the tracer head in the axial direction, and thus the amount by which the cutter is moved is reduced by the amount of this over-run of the tracer head, whereby overshot machining is prevented.

Description of the Preferred Embodiment

An embodiment of the present invention will hereinafter be described with reference to the drawings.

Figure 1:
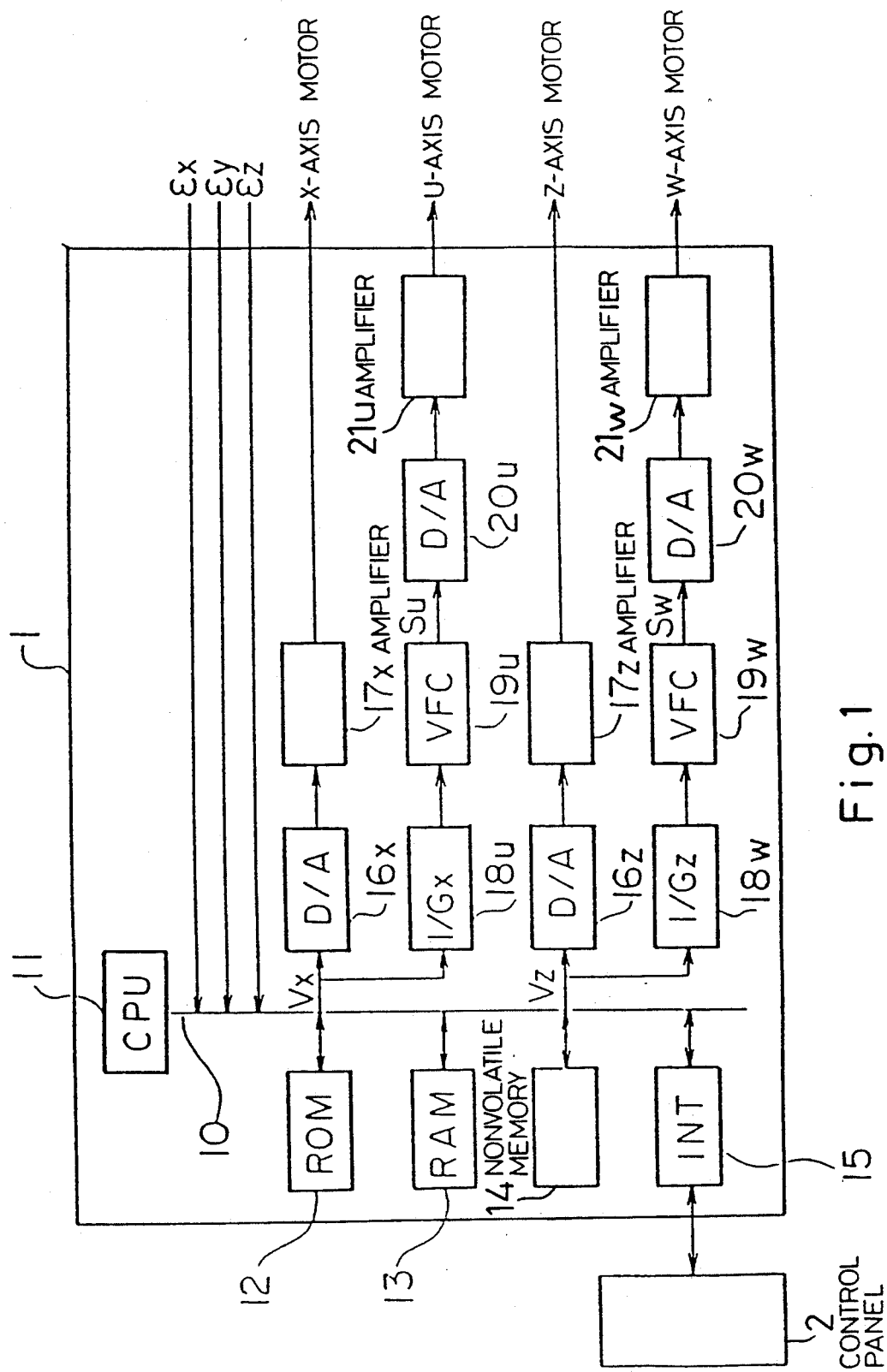
FIG. 1 is a block diagram showing the hardware of a tracing control system according to an embodiment of the present invention.

FIG. 1 is a block diagram showing the hardware of a tracing control system according to an embodiment of the present invention. In FIG. 1, a processor 11 reads a system program stored in a ROM 12, through a bus 10, and controls the overall operation of a tracing control system 1 according to the system program. A RAM 13 stores amounts $\epsilon x$, $\epsilon y$, $\epsilon z$ of displacement of respective axes detected by a tracer head, which will be described later, and other temporary data. A nonvolatile memory 14 is backed up by a battery (not shown), and stores various parameters such as tracing directions, tracing speeds, etc., entered from a control panel 2 through an interface 15.

The processor 11 generates speed command values Vx and Vz of the respective axes based on the amounts $\epsilon x$, $\epsilon y$, $\epsilon z$ of displacement of the respective axes, and the commanded tracing direction and tracing speed, according to the known process. The speed command values Vx and Vz are then converted to analog values by D/A converters 16x and 16z, amplified by servo amplifiers 17x and 17z, and output. Accordingly, each of the main motors of the X-axis and the Y-axis of the tracing machine tool, which will be described later, is driven.

At the same time, the speed command value Vx and Vz are divided to obtain values 1/Gx and 1/Gz at calculating circuits 18u and 18w, respectively. (Note, Gx and Gz are gains of the servo systems of the X-axis and the Y-axis, respectively.) The divided speed command values are then converted into command values Su and Sw at converting circuits 19u and 19w. The command values Su and Sw are converted to analog values by D/A converters 20u and 20w, amplified by servo amplifiers 21u and 21w, and output. Accordingly, each of the sub-motors of the U-axis and the W-axis of the tracing machine tool is driven.

Figure 2:
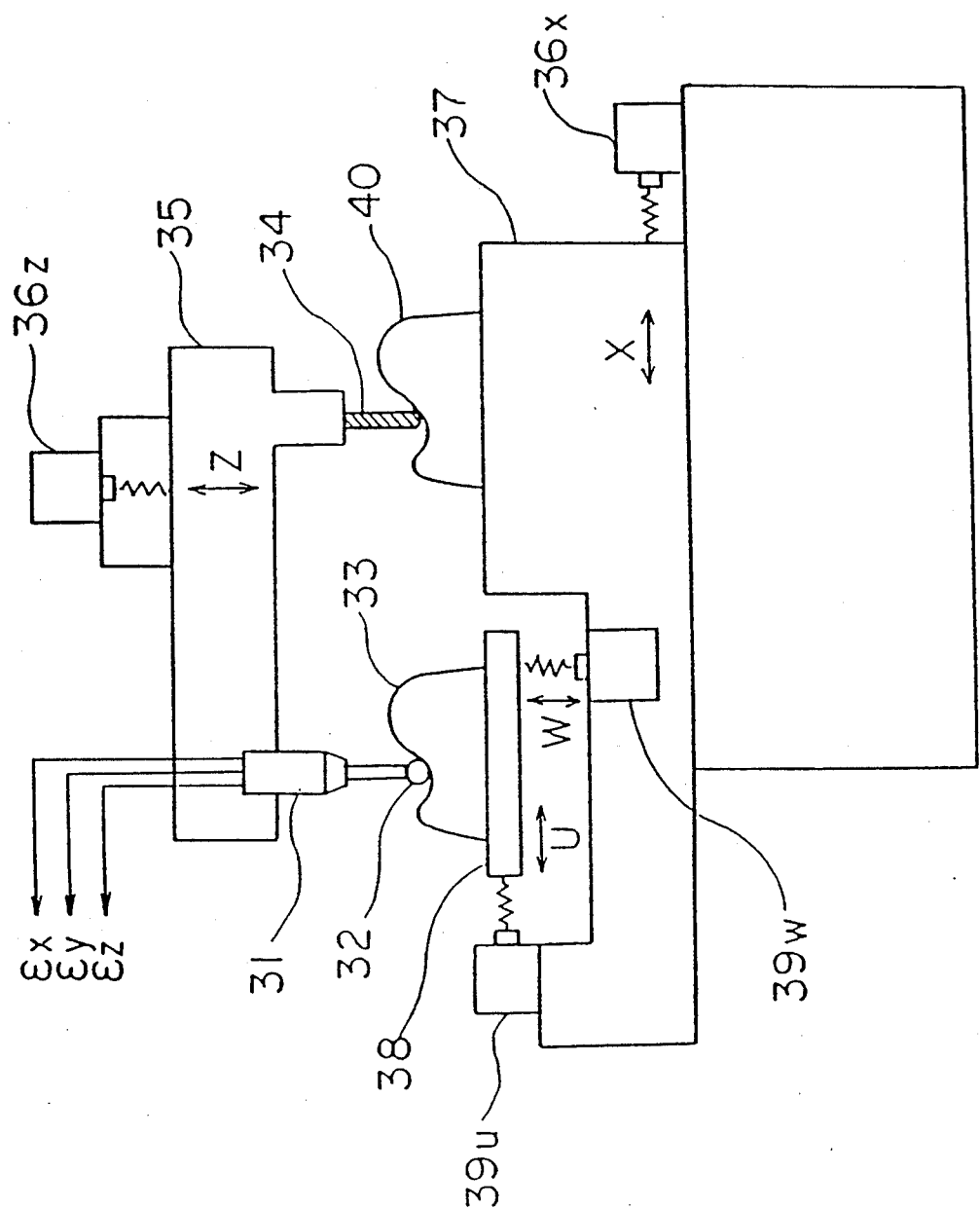
FIG. 2 is a diagram showing the arrangement of a tracing machine tool connected to a tracing control system according to an embodiment of the present invention.

FIG. 2 shows the arrangement of a tracing machine tool connected to the above tracing control system. In FIG. 2, a tracer head 31 detects amounts of displacement $\epsilon x$, $\epsilon y$, $\epsilon z$ in each of the X-axis, the Y-axis and the Z-axis directions, generated by contact of a stylus 32 at the tip end of the tracer head with a model 33, and inputs the detected amounts to the tracing control system 1.

The tracer head 31 and a cutter 34 are both attached to a column 35. The column 35 is moved in the Z-axis direction by a main motor 36z. Further, a main table 37 is moved in the X-axis direction by a main motor 36x. Furthermore, in addition to these main motors, a sub-motor 39u for moving only a sub-table 38, on which the model 33 is placed, in the U-axis direction in parallel with the X-axis, and a sub-motor 39w for similarly moving only the sub-table 38 in the W-axis direction in parallel with the Z-axis are provided in the main table 37. A workpiece 40 is fixed on the main table 37.

The main motors 36x and 36z are driven in accordance with the above-mentioned speed command values Vx and Vy, and the sub-motors 39u and 39w are driven in accordance with the command values Su and Sw.

Note, the command values Su and Sw are proportional to the values acquired by dividing the speed command values Vx and Vy by gains of the servo systems of the X-axis and the Y-axis, respectively, i.e., in proportion to delays in the reactions of the servo systems of the respective axes. Accordingly, when tracing is started, the tracer head 31 is always moved ahead of the cutter 34 by this delay amount.

Figure 3:
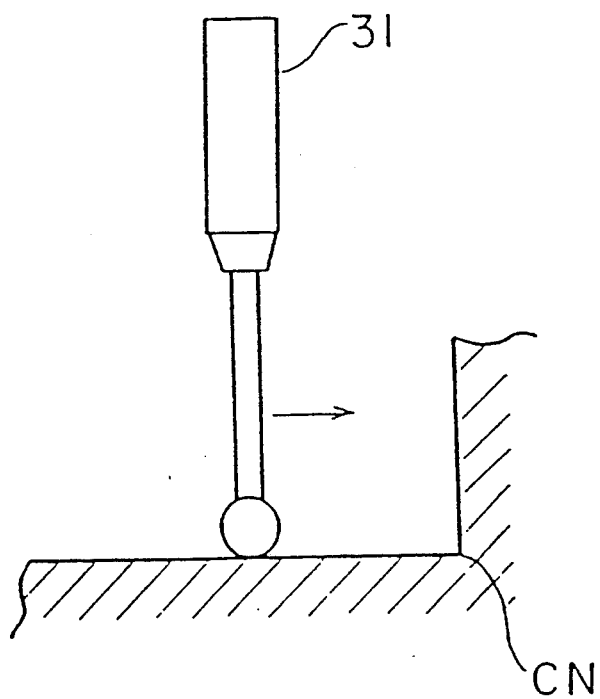
FIG. 3 is an illustration showing a corner of a model.
Figure 3:
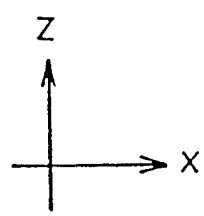

When the tracer head comes to, for example, a corner CN of the model shown in FIG. 3, and the speed in the X-axis direction is reduced (0 in this case) at this time, immediately thereafter the sub-table 38 starts to move in a direction opposite to the preceding direction. Thus, the amount of precedence of the tracer head in the X-axis direction is canceled out. Namely, this time the cutter 34 is at the same position as the tracer head 31, as shown in FIG. 4.

Figure 4:
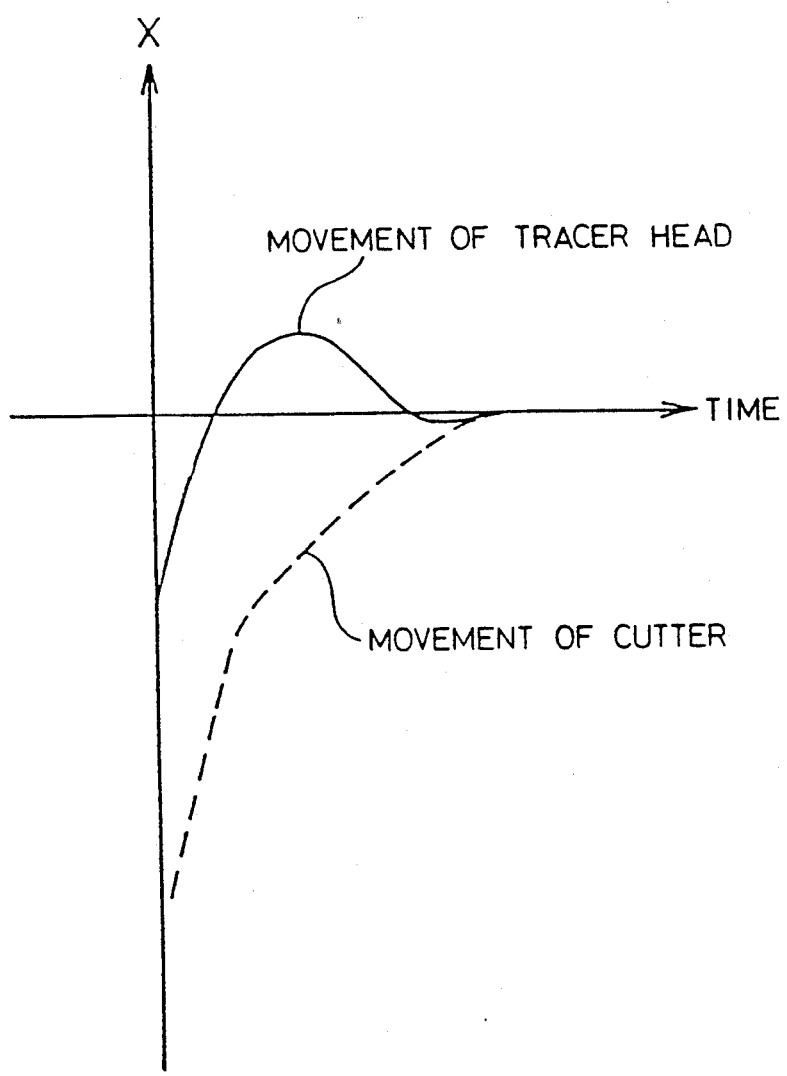
FIG. 4 is a graph showing movement of a tracer head and a cutter at a corner, in accordance with the embodiment of the present invention.

In FIG. 4, the axis of the ordinate shows the position and the axis of the abscissa shows time. A continuous line shows the movement of the tracer head, and a dotted line shows the movement of the cutter. When the tracer head over-runs the model, the positions of the cutter and the tracer head match when the tracer head returns from the over-run position to the normal position. Namely, the amount of movement of the cutter in the X-axis direction is reduced by the amount of over-run of the tracer head. Thus an unwanted excess machining does not occur.

Note, the movement between the column and the main table and between the tracer head and the sub-table are carried out along two axes in the above explanation, but the number of axes can be appropriately increased or decreased.

With the present invention, as described above, as predetermined values in proportion to the amounts of change in the speed command values are obtained and only the model is moved by these amounts, by position command values, even if the tracer head over-runs the model at corners and the like, the cutter does not bite into the workpiece. Thus the precision of the tracing machining is improved.

We claim:

1. A tracing control system for machining a workpiece through tracing by calculating speed command values of respective axes, using change amounts detected by a tracer head, by moving a cutter relative to the workpiece through a control of the speed of the respective axes in accordance with the speed command values and by moving the tracer head along the surface of a model, comprising:

calculating means for calculating predetermined values in proportion to the amounts of change in the speed command values of the respective axes;

a main table; and a sub-table provided on said main table for moving only the model in parallel with the respective axes, said sub-table driven by sub-motors instructed by amounts corresponding to respective ones of the predetermined values.

2. A tracing control system according to claim 1, wherein said respective predetermined values represent amounts of delay in reactions of servo systems of the respective axes.

3. A tracing control system according to claim 2, wherein said amounts of delay are obtained by dividing the speed command values by gains of the servo systems of the corresponding axes.

* * * * *